Aug. 21, 1923.
W. W. MORRAL ET AL
1,465,525
MACHINE FOR CUTTING CORN FROM THE COB
Filed July 22, 1921
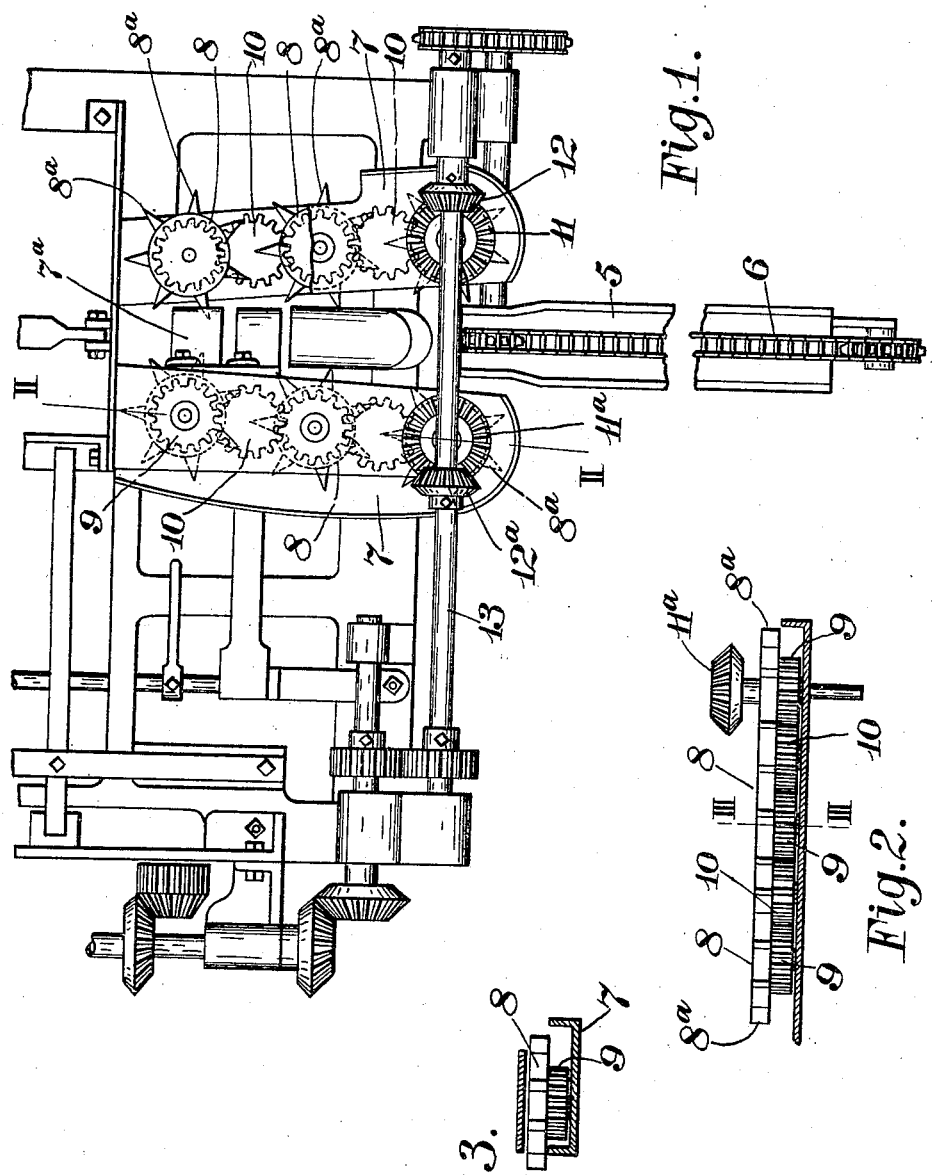
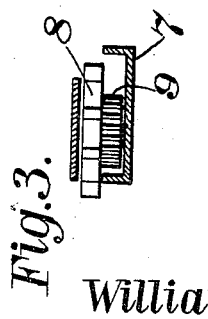
Inventor
William W. Morral
Samuel E. Morral
by Fincnel & Fincnel
their Attorneys Patented Aug. 21, 1923.

1,465,525

UNITED STATES PATENT OFFICE.

WILLIAM W. MORRAL AND SAMUEL E. MORRAL, OF MORRAL, OHIO.

MACHINE FOR CUTTING CORN FROM THE COB.

Application filed July 22, 1921. Serial No. 486,849.

*To all whom it may concern:*

Be it known that we, WILLIAM W. MORRAL and SAMUEL E. MORRAL, citizens of the United States, residing at Morral, in the county of Marion and State of Ohio, have invented a certain new and useful Improvement in Machines for Cutting Corn from the Cob, of which the following is a specification.

The present invention relates to the type of machine shown in the Letters Patent of the United States granted to us November 15, 1910, No. 975,631 and our prior patents therein referred to.

In the construction of said patents the means for feeding the ears into the machine includes a pair of flexible driven belts provided with spurs to engage the opposite sides of the ear. In operation the spurs of a flexible belt or sprocket chain do not remain uniformly spaced in their travel around the driving wheels and as a consequence there is a tendency of the spurs to more or less tear the grains. This effect, however, was somewhat alleviated by making the spurs sharply pointed but sharply pointed spurs are deficient in holding effect. Moreover the driving chains eventually become loose and wabbly. The object of the present invention is to provide spur feeding means in which the spacing of the teeth remains constant thus permitting the use of teeth with broad ends and having a firm ear engaging effect.

The invention is embodied in the example herein shown and described, the features of novelty being finally claimed.

In the accompanying drawings—

Figure 1 is a top plan view showing as much as is necessary of such a machine to illustrate our invention as applied thereto, some parts being broken out and omitted.

Fig. 2 is a section on the line II—II Fig. 1 with parts in full.

Fig. 3 is a section on the line III—III Fig. 2 with parts in full.

The present machine, as in our former patents, includes an ear feeding trough 5 in the bottom of which runs the upper portion of a driven endless belt 6 upon which the ears are placed to be fed into the machine. The present machine also includes, as in our Patent No. 679,156 a pair of plates 7 pivoted at their outer ends, but in the present instance each plate has journaled in it a row of three wheels 8 having spurs or teeth $8^a$ formed with broad knife-like ear engaging ends. These wheels have their lower sides provided with spur gears 9 affixed thereto, and journaled in the plate between these spur gears and meshing therewith are intermediate spur gears 10 so that all the toothed wheels on the same plate shall be turned in the same direction. At the outer or entrance end of the feeding mechanism each plate is also provided with a bevel gear, as shown at 11 and $11^a$ secured to it, said bevel gears being engaged by bevel gears 12 and $12^a$ located on a driven shaft 13 so as to drive the adjacent or ear feeding teeth of the two sets in the same direction.

The plates 7 carrying the spurred wheels can be yieldingly held toward each other at their rear ends by any suitable spring actuated means such for example as shown in our said Patent No. 679,156.

In operation the ear is placed on the feed belt 6 and carried in to the space between the toothed ear feeding wheels where they are firmly engaged by the teeth of those wheels and by them carried to or through suitable knives $7^a$ for removing the grains as in our former patents referred to.

The forms of the parts can be changed without departing from the invention as claimed.

What we claim is:

1. In a machine for cutting corn from the cob, means for feeding ears to the cutter thereof comprising, in combination, a pair of supporting members, a plurality of toothed wheels to engage the ears mounted on said supporting members, said wheels provided with gear wheels, gear wheels between and engaging the gears of the toothed wheels for driving the latter in the same direction, and means for pivoting said supporting members at their forward ends.

2. In a machine for cutting corn from the cob, means for feeding ears to the cutter thereof comprising, in combination, a pair of pivoted supporting members, a plurality of toothed wheels to engage the ears mounted on said supporting members, said wheels provided with gear wheels, gear wheels between and engaging the gears of the toothed wheels for driving the latter in the same direction and means for driving the two sets of toothed wheels at their adjacent rims in the same direction.

3. In a machine for cutting corn from the cob, means for feeding ears to the cutter thereof comprising, in combination, a pair of supporting members, a plurality of toothed wheels to engage the ears mounted on said supporting members, said wheels provided with gear wheels, gear wheels between and engaging the said gear wheels, means for driving the two sets of toothed wheels in the same direction and corn cutting knives located between said supporting members.

4. In a machine for cutting corn from the cob, means for feeding ears to the cutting knives thereof, comprising, in combination, a pair of yielding supporting members, a plurality of toothed ear feeding wheels mounted on each of said supporting members, means for driving the two sets of toothed wheels to feed the ears to the cutting knives, the said cutting knives located between said supporting members and the teeth of said toothed wheels located to pass between said knives.

5. In a machine for cutting corn from the cob, means for feeding ears to the cutting knives thereof, comprising, in combination, a pair of yielding supporting members pivoted at their forward ends, a plurality of toothed ear feeding wheels mounted on each of said supporting members, means for driving the two sets of toothed wheels to feed the ears to said cutting knives, said cutting knives located between said supporting members.

6. In a machine for cutting corn from the cob, means for feeding ears to the cutter thereof comprising, in combination, a pair of supporting members pivoted at their forward ends, a plurality of toothed wheels to engage the ears mounted on said supporting members, said wheels provided with gear wheels, gear wheels between and engaging the said gear wheels, means for driving the two sets of toothed wheels in the same direction and corn cutting knives located between said supporting members.

7. In a machine for cutting corn from the cob, the combination of two sets of toothed ear feeding wheels provided with spur gears, the teeth of said feeding wheels adapted to engage the opposite sides of the ear and means for turning each set of the ear engaging wheels in the same direction consisting of spur gears intermediate the spur gears of the ear feeding wheels each set of ear feeding wheels and spur gears, and a yielding support for each set of feeding wheels and spur gears.

WILLIAM W. MORRAL.
SAMUEL E. MORRAL.